(12) United States Patent
Paulhart et al.

(10) Patent No.: US 9,938,883 B2
(45) Date of Patent: Apr. 10, 2018

(54) METHOD AND DEVICE FOR OPERATING AN ENGINE COMPARTMENT FAN FOR A MOTOR VEHICLE

(71) Applicant: Robert Bosch GmbH, Stuttgart (DE)

(72) Inventors: Harald Paulhart, Katzelsdorf (AT); Andreas Grubmueller, Durnrohr (AT)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 14/882,135

(22) Filed: Oct. 13, 2015

(65) Prior Publication Data

US 2016/0123215 A1 May 5, 2016

(30) Foreign Application Priority Data

Oct. 31, 2014 (DE) .................. 10 2014 222 304

(51) Int. Cl.
*F01P 7/04* (2006.01)
*B60K 11/08* (2006.01)
*F01P 7/08* (2006.01)

(52) U.S. Cl.
CPC ............... *F01P 7/04* (2013.01); *B60K 11/08* (2013.01); *F01P 7/048* (2013.01); *F01P 7/08* (2013.01); *F01P 2025/13* (2013.01); *F01P 2025/32* (2013.01); *F01P 2025/44* (2013.01); *F01P 2025/48* (2013.01); *F01P 2025/66* (2013.01)

(58) Field of Classification Search
CPC .................................. F01P 7/026; F01P 5/02
See application file for complete search history.

(56) References Cited

U.S. PATENT DOCUMENTS

| 4,327,674 A * | 5/1982 | Takei ...................... F01P 5/043 |
| | | 123/41.12 |
| 2001/0039927 A1* | 11/2001 | Oishi ...................... F01P 7/048 |
| | | 123/41.12 |
| 2010/0236502 A1* | 9/2010 | Watanabe ................ B60K 6/48 |
| | | 123/41.02 |

FOREIGN PATENT DOCUMENTS

JP    2008-175171 A   *   7/2008

* cited by examiner

*Primary Examiner* — Kevin A Lathers
(74) *Attorney, Agent, or Firm* — Norton Rose Fulbright US LLP; Gerard Messina

(57) ABSTRACT

A method for operating an engine compartment fan for an engine compartment of a motor vehicle, in which at least one component, in particular for the drive of the motor vehicle, is situated, including the following: ascertaining a present engine compartment temperature as a function of a thermal energy input into the engine compartment and a thermal energy discharge out of the engine compartment; and activating the engine compartment fan as a function of the ascertained present engine compartment temperature.

15 Claims, 3 Drawing Sheets

METHOD AND DEVICE FOR OPERATING AN ENGINE COMPARTMENT FAN FOR A MOTOR VEHICLE

RELATED APPLICATION INFORMATION

The present application claims priority to and the benefit of German patent application no. 10 2014 222 304.0, which was filed in Germany on Oct. 31, 2014, the disclosure of which is incorporated herein by reference.

FIELD OF THE INVENTION

The present invention relates to motor vehicles, in particular engine compartment fans for motor vehicles, to dissipate heat generated by the operation of an internal combustion engine and to prevent overheating of components in the engine compartment.

BACKGROUND INFORMATION

In a motor vehicle operated using an internal combustion engine, heat is introduced into an engine compartment of the motor vehicle by the internal combustion engine and an exhaust gas system. To dissipate this heat, an airflow permeates the engine compartment during a movement of the motor vehicle. If the airflow is not sufficient for dissipating the thermal energy introduced by the internal combustion engine and the exhaust gas system because of an excessively low vehicle speed, the dissipation of the thermal energy is assisted by an engine compartment fan. Overall, components in the engine compartment are to be prevented from being damaged as a result of excessively high heat input.

Engine compartment fans are typically not configured for high numbers of operating hours over their service life. However, based on a conventional two-point regulation for operating the engine compartment fan, it may not be ensured that the number of operating hours guaranteed by the producer is not exceeded.

SUMMARY OF THE INVENTION

According to the present invention, a method for operating an engine compartment fan for an engine compartment of a motor vehicle according to the descriptions herein, and a device and a motor vehicle according to the other descriptions herein.

Further embodiments are specified in the further descriptions herein.

According to a first aspect, a method is provided for operating an engine compartment fan for an engine compartment of a motor vehicle, in which at least one component is situated, in particular for the drive of the motor vehicle.

The method includes the following steps:
  ascertaining a present engine compartment temperature as a function of a thermal energy input into the engine compartment and a thermal energy discharge from the engine compartment; and
  activating the engine compartment fan as a function of the ascertained present engine compartment temperature.

One concept of the above-mentioned method is not to operate the engine compartment fan according to a regulation based on an actual temperature measurement in the engine compartment, but rather as a function of the thermal energy inputs and thermal energy discharges into or out of the engine compartment of the motor vehicle, in particular as a function of a corresponding thermal energy balance, and to predict a temperature curve of the temperature in the engine compartment. An additional cooling power demand is ascertained accordingly, which is to be provided by the engine compartment fan.

In a conventional method for regulating the engine compartment fan, a two-point regulation is provided, which takes into consideration a tolerance range. Therefore, the engine compartment fan is already turned on before the critical limiting temperature, which is not to be exceeded, of the engine compartment is reached. This may result in activation of the engine compartment fan in operating cases in which the limiting temperature would not be exceeded. The number of operating hours of the engine compartment fan is thus increased unnecessarily.

Unnecessarily turning on the engine compartment fan may be prevented by way of the additional cooling power demand, which is ascertained via an ascertainment of the thermal energy balance, and the activation of the engine compartment fan dependent thereon. The above-mentioned method basically provides, as a function of the thermal energy inputs into and thermal energy discharges out of the engine compartment of a motor vehicle, for carrying out the quantities of heat introduced into the engine compartment or discharged out of the engine compartment, by which a time curve of the engine compartment temperature is determined. The above activation strategy of the engine compartment fan as a function of the thermal energy balance therefore takes into consideration a chronological aspect of the cooling and heating of the engine compartment, so that the engine compartment fan is only turned on when the exhaust gas system and/or the internal combustion engine has/have introduced a specific quantity of heat into the engine compartment, which cannot be dissipated by airflow cooling.

One advantage of the above-mentioned method is that no temperature sensor for detecting the engine compartment temperature is necessary to operate an engine compartment fan. Furthermore, it may be ensured that the engine compartment fan is only turned on when it is necessary for efficient cooling of the engine compartment, since the thermal energy input is greater than the thermal energy discharge caused as a result of the airflow cooling, and the risk exists that the limiting temperature for the engine compartment will be exceeded.

Furthermore, the ascertainment of the present engine compartment temperature may include the following steps:
  providing at least one specification of the present temperature of the at least one component in the engine compartment of the motor vehicle;
  ascertaining the thermal energy input into the engine compartment as a function of the at least one specification of the present temperature of the at least one component.

It may be provided that the thermal energy input into the engine compartment is determined as a function of a total of the specifications, which are each weighted in particular, of the present temperature of multiple components in the engine compartment of the motor vehicle or as a function of a maximum value of the at least one specification, which is weighted in each case in particular, of the present temperature of the at least one component in the engine compartment of the motor vehicle.

According to one specific embodiment, the thermal energy discharge from the engine compartment may be ascertained as a function of passive air permeation of the engine compartment, in particular the passive air permeation of the engine compartment being ascertained as a function of the vehicle speed and the ambient temperature.

Furthermore, the present engine compartment temperature may be determined as a function of an integration of the introduced thermal energy difference from the thermal energy input and the thermal energy discharge.

It may be provided that the integration is carried out within a minimum value, which is a function of the ambient temperature, and a predefined maximum value.

In particular, the integration may be reset to a value, which is a function of an ambient temperature, if it is determined that a vehicle speed is greater, for a predetermined duration, than a predefined speed threshold.

Furthermore, after a shutdown of the internal combustion engine, an overrun of the engine compartment fan may be provided, the engine compartment fan being started or the operation of the engine compartment fan being maintained if or as long as the last ascertained engine compartment temperature is greater than a predefined shutdown temperature threshold.

Alternatively or additionally, after a shutdown of the internal combustion engine, an overrun of the engine compartment fan may be provided, the engine compartment fan being started or the operation of the engine compartment fan being maintained as a function of the at least one specification of the present temperature of the at least one component in the engine compartment of the motor vehicle.

According to a further aspect, a device is provided, in particular a control unit, for operating an engine compartment fan for an engine compartment of a motor vehicle, in which at least one component is situated, in particular for the drive of the motor vehicle. The device is configured to:

ascertain a present engine compartment temperature as a function of a thermal energy input into the engine compartment and a thermal energy discharge out of the engine compartment;

activate the engine compartment fan as a function of the ascertained present engine compartment temperature.

According to a further aspect, a motor vehicle is provided, an engine compartment including the following:

at least one component, in particular for the drive of the motor vehicle, which supplies a thermal energy input into the engine compartment;

a unit for cooling the engine compartment by way of an airflow;

an engine compartment fan;

the above device.

Specific embodiments will be explained in greater detail hereafter on the basis of the drawings.

DETAILED DESCRIPTION

Figure 1:
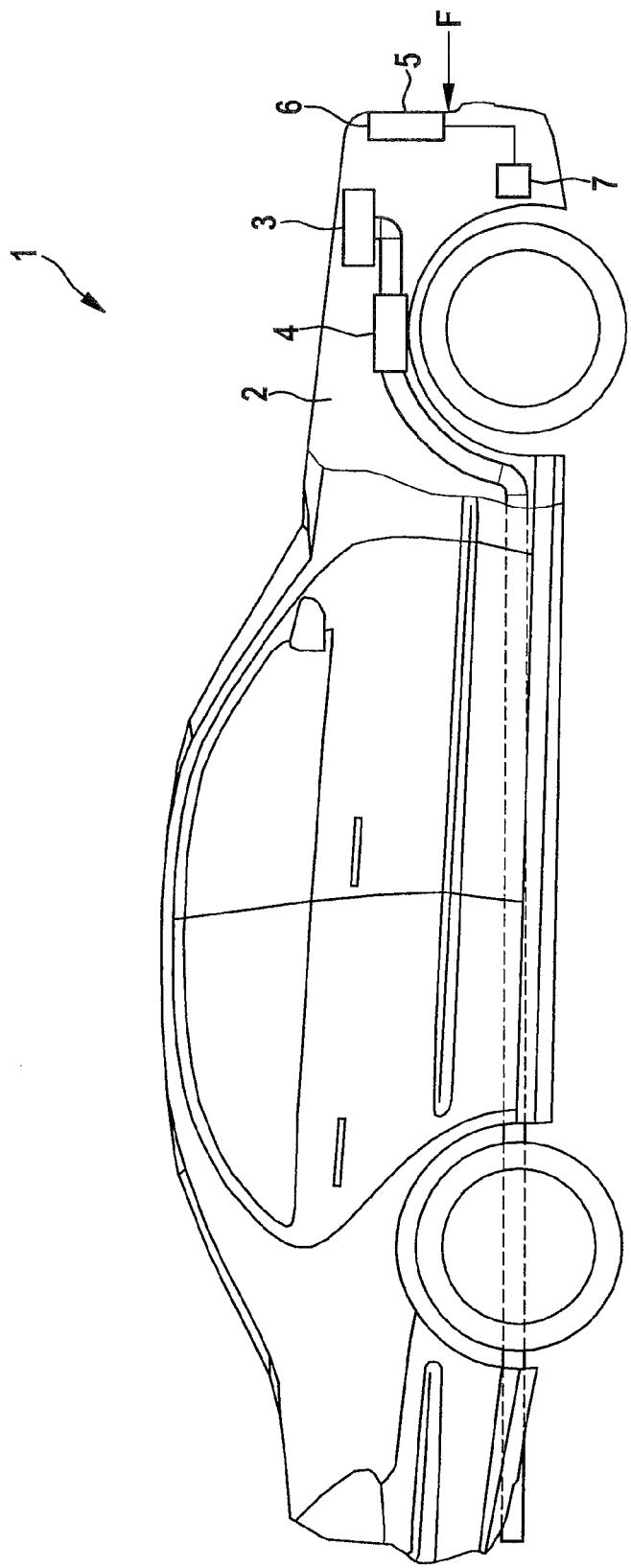
FIG. 1 shows a schematic representation of a motor vehicle including an engine compartment for an engine system.

FIG. 1 schematically shows a motor vehicle 1 including an engine compartment 2. Engine compartment 2 is provided with one or multiple components which emit heat during operation, such as an internal combustion engine 3 and an exhaust gas system 4. Internal combustion engine 3 expels combustion exhaust gas via exhaust gas system 4. Engine compartment 2 is essentially closed, but ambient air may flow through it. Engine compartment 2 is typically (but not necessarily) located frontally in motor vehicle 1 and is frontally open via an air inlet unit 5, for example, a radiator grill 5, so that during a movement of vehicle 1 in a forward direction, ambient air flows as airflow F through engine compartment 2.

Furthermore, an engine compartment fan 6 may be provided close to air inlet unit 5, to assist or boost the flow of ambient air through engine compartment 2, if airflow cooling is inadequate because of an excessively low vehicle speed. Engine compartment fan 6 may be configured as variably controllable or may only be turned on and off.

A control unit 7 is provided, which is used for activating engine compartment fan 6. A function, in particular a software function, is executed in control unit 7, as shown in the function diagram of FIG. 2.

In a first thermal energy input map 11, a detected or modeled specification of a temperature $T_{exhaust\_gas1}$, $T_{exhaust\_gas2}$, $T_{engine}$ of the components emitting heat, i.e., sections of exhaust gas system 4 and internal combustion engine 3, is evaluated and a resulting thermal energy input into engine compartment 2 is estimated with the aid of thermal energy input map 11. The estimation may be carried out based either on a total of weighted temperatures $T_{exhaust\_gas1}$, $T_{exhaust\_gas2}$, $T_{engine}$ of sections of exhaust gas system 4 or of internal combustion engine 3. Temperatures $T_{exhaust\_gas1}$, $T_{exhaust\_gas2}$, $T_{engine}$ are weighted for this purpose with the aid of a multiplication element 12 using corresponding weighting factors $G_{exhaust\_gas1}$, $G_{exhaust\_gas2}$, and $G_{engine}$, to obtain weighted temperatures $G_{exhaust\_gas1}*T_{exhaust\_gas1}$, $G_{exhaust\_gas2}*T_{exhaust\_gas2}*G_{engine}*T_{engine}$. Weighting factors $G_{exhaust\_gas1}$, $G_{exhaust\_gas2}$, and $G_{engine}$ are applied and depict a heat transfer coefficient of the relevant component in engine compartment 2 and the arrangement of components 3, 4 in engine compartment 2.

Figure 2:
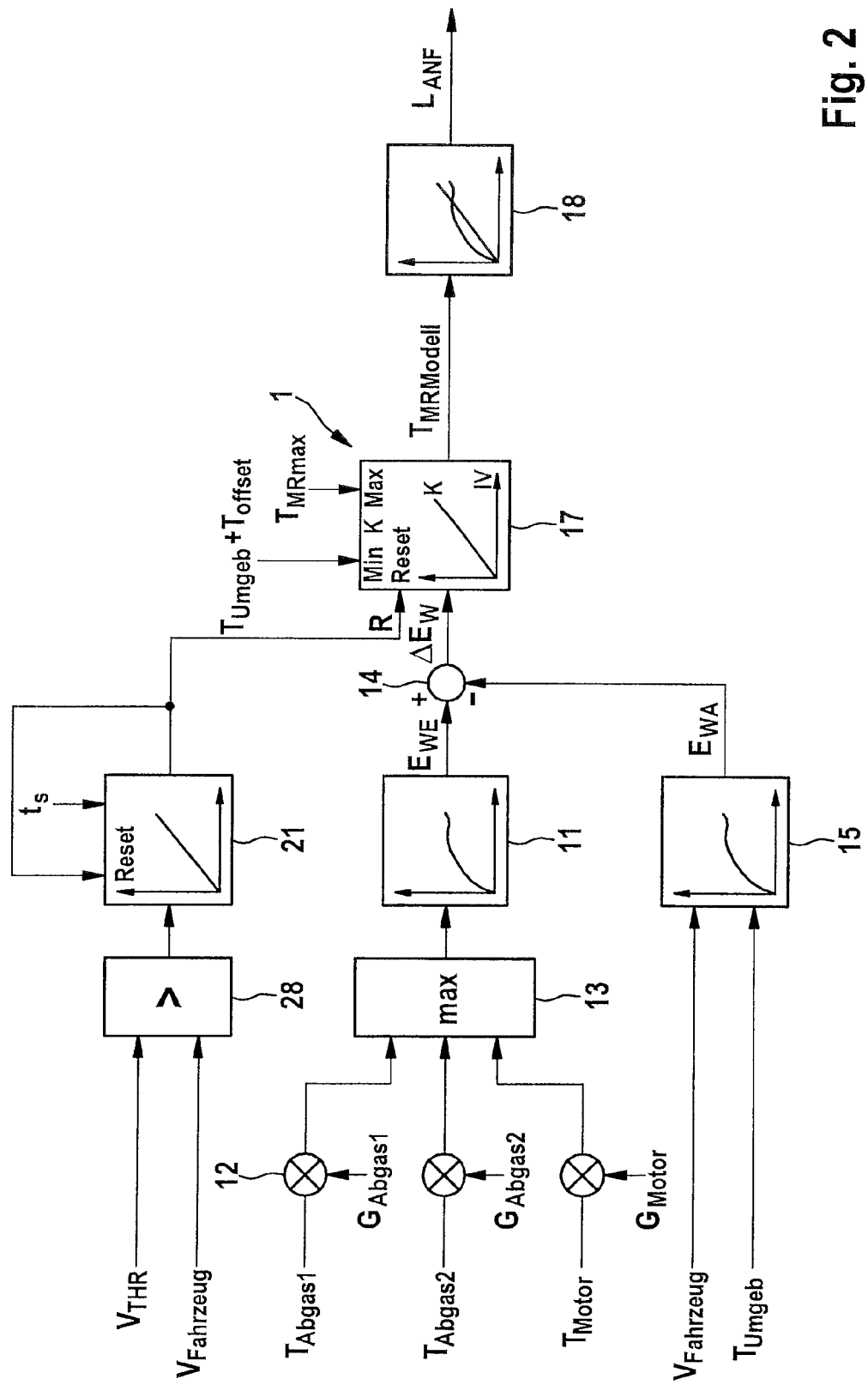
FIG. 2 shows a function diagram to illustrate a function for operating an engine compartment fan.

Alternatively, in particular instead of the summation, as shown in FIG. 2, with the aid of a maximum formation in a maximum block 13 for all components 3, 4, the highest value of weighted temperatures $G_{exhaust\_gas1}*T_{exhaust\_gas1}$, $G_{exhaust\_gas2}*T_{exhaust\_gas2}$, $G_{engine}*T_{engine}$ may be relayed as an input variable to thermal energy input map 11, since it decisively determines the thermal energy input. Weighting factors $G_{exhaust\_gas1}$, $G_{exhaust\_gas2}$, and $G_{engine}$ may also be selected as identical here, to approximately simulate the thermal energy input under the assumption that all components 3, 4 have the maximum temperature occurring in engine compartment 2. The thermal energy input from the engine system formed of internal combustion engine 3 and exhaust gas system 4 may also be ascertained solely as a function of a temperature in exhaust gas system 4 or the temperature of internal combustion engine 3.

Thermal energy input $E_{WE}$, which is supplied by thermal energy input map 11, is supplied to a subtraction function 14 and a thermal energy discharge $E_{WA}$ is subtracted to obtain a thermal energy balance. Thermal energy discharge $E_{WA}$ is ascertained from a thermal energy discharge map 15 as a function of vehicle speed $v_{vehicle}$ and temperature $T_{ambient}$ of the ambient air. Thermal energy discharge $E_{WA}$ is physically determined by the ambient air flowing through air inlet unit 5 during travel of motor vehicle 1, whereby airflow cooling is achieved.

In one specific embodiment, during the preparation of the above thermal energy balance, the thermal energy discharge may also be taken into consideration, which is caused by a previously performed activation of engine compartment fan 6.

Thermal energy difference $\Delta E_W$, which is ascertained as a result of the subtraction of thermal energy input $E_{WE}$ and thermal energy discharge $E_{WA}$, is supplied to an integration function 17. The integration in integration function 17 takes place over time, and a modeled temperature value $T_{MRmodel}$ of the present temperature level actually prevailing in engine compartment 2 is thus obtained.

A cooling requirement $L_{ANF}$ for engine compartment fan 6 is calculated on the basis of ascertained or modeled temperature value $T_{MRmodel}$ of the present engine compartment temperature actually prevailing in engine compartment 2 via characteristic curve function 18. Cooling requirement $L_{ANF}$ may be a variable cooling requirement having values of, for example, between 0% and 100%, which may be specified, for example, as a pulse duty factor for activating the engine compartment fan, or may be an on/off requirement for engine compartment fan 6. Engine compartment fan 6 may be turned on or off as a function of variable cooling requirement $L_{ANF}$, for example, as a function of a threshold value comparison to a predefined cooling requirement threshold value of, for example, 50%.

In the case in which engine compartment fan 6 may only be turned on and off, characteristic curve function 18 only outputs an on/off switching signal to the engine compartment fan, which is generated as a function of a result of a threshold value comparison of the thermal energy input into engine compartment 2 and a predefined thermal energy threshold value. In particular, the engine compartment fan is turned on when the thermal energy located in the engine compartment exceeds the determined thermal energy threshold value, and is turned off when the value falls below this thermal energy threshold value.

Integration function 17 is limited by a minimum value Min and a maximum value Max. The integration value thus may not drift away in the positive direction or in the negative direction in the event of inaccurate estimation by thermal energy input map 11 or thermal energy discharge map 15, i.e., may not deviate by an arbitrarily large amount from the actual engine room temperature. Minimum value Min may result from ambient temperature $T_{ambient}$, which is generally provided in a vehicle as a specification, plus a freely applicable predefined temperature offset $T_{offset}$. Maximum value Max may correspond to a maximum achievable limiting value or maximum temperature $T_{MRMax}$ of engine compartment 2, which is predefined and in principle takes into consideration the temperature resistance of (passive) components situated in engine compartment 2.

Figure 3:
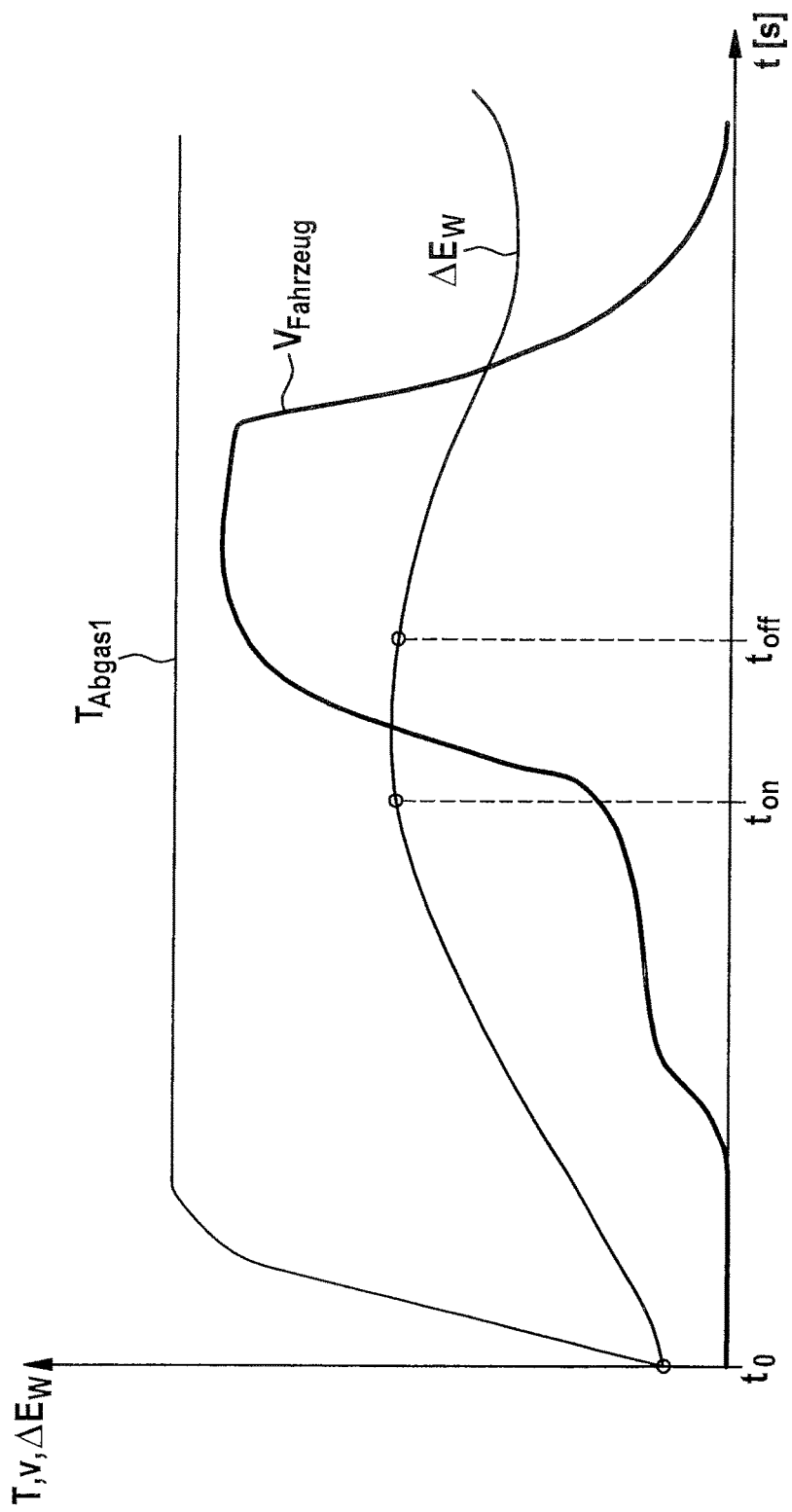
FIG. 3 shows a graph to illustrate the time curves of the temperature in the exhaust gas system, the vehicle speed, and the thermal energy input into the engine compartment.

FIG. 3 shows time curves of temperature $T_{exhaust\_gas1}$ of the section of exhaust gas system 3, vehicle speed $v_{vehicle}$ and thermal energy $\Delta E_W$ introduced into engine compartment 2. Turn-on time $t_{on}$ is apparent, at which the described function turns on engine compartment fan 6, and a time $t_{off}$, at which the above-described function turns off engine compartment fan 6.

In the case of motor vehicles which are stationary for a long time with running internal combustion engine 3 or drive slowly, as a result of the integration, the maximum achievable temperature level of engine compartment 2 is always reached, since the level of thermal energy discharge $E_{WA}$ may never reach the level of thermal energy input $E_{WE}$. Engine compartment fan 6 is thus also turned on after a specific duration in this operating range (i.e., slowly driving or stationary vehicle).

In addition, it may be provided that the integration value is reset to a starting value, i.e., the minimum achievable temperature level of the engine compartment, i.e., to the total of ambient temperature $T_{ambient}$ and freely applicable predefined temperature offset $T_{offset}$ of, for example, 20° C., as soon as vehicle speed $v_{vehicle}$ is above a predefined speed threshold $V_{THR}$ for a sufficiently long time. This takes into consideration that at high vehicle speeds, experience has shown that a measurable temperature equilibrium, which is always a function in the same way of ambient temperature $T_{ambient}$, results. It may thus be presumed that at a high vehicle speed, the engine compartment temperature has cooled down enough as a result of the fresh air permeation of engine compartment 2 that the minimum temperature level achievable in operation of engine compartment 2 has been reached. The reset is implemented by a comparison function 20 for comparing vehicle speed $v_{vehicle}$ to speed threshold $V_{THR}$ and a downstream timer 21, which outputs a reset signal R to integrator function 17 as soon as vehicle speed $v_{vehicle}$ is greater than speed threshold $V_{THR}$ for a predetermined duration $t_s$. Active reset signal R resets integrator 17 to the value of the total of ambient temperature $T_{ambient}$ and freely applicable predefined temperature offset $T_{offset}$ and also resets timer 21.

Furthermore, an overrun function may be provided for engine compartment fan 6, which may become active when internal combustion engine 3 is turned off, i.e., shutdown of internal combustion engine 3, which may be signaled, for example, by a terminal-15-off. Last ascertained engine compartment temperature $T_{MRmodel}$ of the temperature level actually prevailing in engine compartment 2 is compared to a shutdown temperature threshold value $T_{shutdown\_THR}$. If ascertained temperature value $T_{MRmodel}$ in engine compartment 2 is greater than or equal to shutdown temperature threshold value $T_{shutdown\_THR}$, the overrun of engine compartment fan 6 is started or the operation of engine compartment fan 6 is maintained for an engine compartment temperature overrun time. The engine compartment temperature overrun time corresponds to a duration which is a function of ascertained temperature value $T_{MRmodel}$ in engine compartment 2 and is ascertained by a predefined engine compartment temperature overrun time map as a function of ascertained temperature value $T_{MRmodel}$.

Alternatively or additionally, it may be provided that last cooling requirement $L_{ANF}$ ascertained before the shutdown of internal combustion engine 2, which may correspond to an amount between 0% and 100%, is compared to a cooling requirement threshold value. If cooling requirement $L_{ANF}$ is greater than or equal to the cooling requirement threshold value, the overrun of engine compartment fan 6 is started or the operation of engine compartment fan 6 is maintained for a cooling requirement overrun time. The cooling requirement overrun time corresponds to a duration which is a function of ascertained cooling requirement $L_{ANF}$ and is ascertained by a predefined ascertained cooling requirement overrun time map as a function of ascertained cooling requirement $L_{ANF}$.

Alternatively or additionally, it may be provided that last maximum temperature $T_{exhaust\_gas1}$, $T_{exhaust\_gas2}$, $T_{engine}$ of a component 3, 4 which is ascertained before the shutdown of internal combustion engine 2 is compared to a component temperature threshold value. If the maximum temperature is greater than or equal to the component temperature threshold value, the overrun of engine compartment fan 6 is started or the operation of engine compartment fan 6 is maintained for a component temperature overrun time. The component temperature overrun time corresponds to a duration which is a function of the ascertained maximum temperature and is ascertained by a predefined component temperature overrun time map as a function of the ascertained maximum temperature.

This is used to simulate post-heating effects of internal combustion engine 3 and exhaust gas system 4 after the shutdown of internal combustion engine 3. Therefore, the thermal energy inputs of temperatures $T_{exhaust\_gas1}$, $T_{exhaust\_gas2}$, $T_{engine}$ of the sections of exhaust gas system 4 and internal combustion engine 3 are additionally taken into consideration, for example, via the maximum formation by maximum function 13. This is used to also extend the control unit overrun in favor of the cooling of engine compartment 2 even if ascertained engine compartment temperature $T_{MR\_model}$ of the temperature level at the time of the engine shutdown has not yet exceeded the engine compartment temperature threshold value, but the temperatures of exhaust gas system 4 or internal combustion engine 3 nonetheless supply a thermal energy input which may probably result in a limiting temperature being exceeded in engine compartment 2. In this case, the overrun of engine compartment 6 is ascertained via a predefined component temperature overrun time map, which calculates the chronological extension of the overrun of engine compartment fan 6 on the basis of the result of the above maximum formation.

The total overrun time is set in accordance with a maximum of the engine compartment temperature overrun time and/or the cooling requirement overrun time and/or the component temperature overrun time.

What is claimed is:

1. A method for operating an engine compartment fan for an engine compartment of a motor vehicle, in which at least one component is situated, the method comprising:
   ascertaining a present engine compartment temperature as a function of a thermal energy input into the engine compartment and a thermal energy discharge out of the engine compartment; and
   activating the engine compartment fan as a function of the ascertained present engine compartment temperature;
   wherein the present engine compartment temperature is determined as a function of an integration of the introduced thermal energy difference from the thermal energy input and the thermal energy discharge, and
   wherein one of the following is satisfied: (i) the integration is carried out within a minimum value, which is a function of an ambient temperature, and a predefined maximum value, or (ii) the integration is reset to a value, which is a function of an ambient temperature, if it is determined that a vehicle speed is greater for a predetermined duration than a predefined speed threshold.

2. The method of claim 1, wherein the ascertainment of the present engine compartment temperature includes:
   providing at least one specification of the present temperature of the at least one component in the engine compartment of the motor vehicle; and
   ascertaining the thermal energy input into the engine compartment as a function of the at least one specification of the present temperature of the at least one component.

3. The method of claim 2, wherein the thermal energy input into the engine compartment is determined as a function of a total of the at least one specification, which is weighted in particular in each case, of the present temperature of the at least one component in the engine compartment of the motor vehicle or as a function of a maximum value of the at least one specification, which is weighted in particular in each case, of the present temperature of the at least one component in the engine compartment of the motor vehicle.

4. The method of claim 1, wherein the thermal energy discharge out of the engine compartment is ascertained as a function of a passive air permeation of the engine compartment, in particular the passive air permeation of the engine compartment being ascertained as a function of the vehicle speed and the ambient temperature.

5. The method of claim 1, wherein the integration is carried out within the minimum value, which is a function of the ambient temperature, and the predefined maximum value.

6. The method of claim 1, wherein the integration is reset to the value, which is a function of the ambient temperature, if it is determined that the vehicle speed is greater for the predetermined duration than the predefined speed threshold.

7. The method of claim 1, wherein, after a shutdown of the internal combustion engine, an overrun of the engine compartment fan is provided, the engine compartment fan being started or the operation of the engine compartment fan being maintained if or as long as the last ascertained engine compartment temperature is greater than a predefined shutdown temperature threshold value.

8. The method of claim 1, wherein after a shutdown of the internal combustion engine, an overrun of the engine compartment fan is provided, the engine compartment fan being started or the operation of the engine compartment fan being maintained as a function of at least one of the following parameters:
   at least one specification of the present temperature of the at least one component in the engine compartment of the motor vehicle;
   the last ascertained engine compartment temperature; and
   a cooling requirement ascertained from the ascertained engine compartment temperature.

9. The method of claim 1, wherein the at least one component is for the drive of the motor vehicle, including at least one of an internal combustion engine and an exhaust gas system.

10. A device for operating an engine compartment fan for an engine compartment of a motor vehicle, in which at least one component is situated, comprising:
    a control unit configured to perform the following:
      ascertaining a present engine compartment temperature as a function of a thermal energy input into the engine compartment and a thermal energy discharge out of the engine compartment, and
      activating the engine compartment fan as a function of the ascertained present engine compartment temperature;
    wherein the present engine compartment temperature is determined as a function of an integration of the introduced thermal energy difference from the thermal energy input and the thermal energy discharge, and
    wherein one of the following is satisfied: (i) the integration is carried out within a minimum value, which is a function of an ambient temperature, and a predefined maximum value, or (ii) the integration is reset to a value, which is a function of an ambient temperature, if it is determined that a vehicle speed is greater for a predetermined duration than a predefined speed threshold.

11. The device of claim 10, wherein the at least one component is for the drive of the motor vehicle, including at least one of an internal combustion engine and an exhaust gas system.

12. A motor vehicle, comprising:
an engine compartment having:
- at least one component which supplies a thermal energy input into the engine compartment;
- an engine compartment fan; and
- a device configured to operate the engine compartment, by performing the following:
  - ascertaining a present engine compartment temperature as a function of a thermal energy input into the engine compartment and a thermal energy discharge out of the engine compartment, and
  - activating the engine compartment fan as a function of the ascertained present engine compartment temperature;
- wherein the present engine compartment temperature is determined as a function of an integration of the introduced thermal energy difference from the thermal energy input and the thermal energy discharge, and
- wherein one of the following is satisfied: (i) the integration is carried out within a minimum value, which is a function of an ambient temperature, and a predefined maximum value, or (ii) the integration is reset to a value, which is a function of an ambient temperature, if it is determined that a vehicle speed is greater for a predetermined duration than a predefined speed threshold.

13. The motor vehicle of claim 12, wherein the at least one component is for the drive of the motor vehicle, including at least one of an internal combustion engine and an exhaust gas system.

14. A computer readable medium having a computer program, which is executable by a processor, comprising:
- a program code arrangement having program code for operating an engine compartment fan for an engine compartment of a motor vehicle, in which at least one component is situated, by performing the following:
  - ascertaining a present engine compartment temperature as a function of a thermal energy input into the engine compartment and a thermal energy discharge out of the engine compartment; and
  - activating the engine compartment fan as a function of the ascertained present engine compartment temperature;
- wherein the present engine compartment temperature is determined as a function of an integration of the introduced thermal energy difference from the thermal energy input and the thermal energy discharge, and
- wherein one of the following is satisfied: (i) the integration is carried out within a minimum value, which is a function of an ambient temperature, and a predefined maximum value, or (ii) the integration is reset to a value, which is a function of an ambient temperature, if it is determined that a vehicle speed is greater for a predetermined duration than a predefined speed threshold.

15. The computer readable medium of claim 14, wherein the at least one component is for the drive of the motor vehicle, including at least one of an internal combustion engine and an exhaust gas system.

\* \* \* \* \*